United States Patent [19]

Mizunoe et al.

[11] Patent Number: 4,998,238

[45] Date of Patent: Mar. 5, 1991

[54] APPARATUS WITH MULTIPLE HEADS ADJUSTED FOR OPTIMUM PERFORMANCE AT DIFFERENT REGIONS OF OPTICAL DISK

[75] Inventors: Katsumi Mizunoe; Hisharu Kaneko, both of Yokohama, Japan

[73] Assignee: Nikon Corporation, Tokyo, Japan

[21] Appl. No.: 427,959

[22] Filed: Oct. 25, 1989

Related U.S. Application Data

[63] Continuation of Ser. No. 172,678, Mar. 24, 1988, abandoned.

[30] Foreign Application Priority Data

Mar. 30, 1987 [JP] Japan .................................. 62-79423

[51] Int. Cl.$^5$ .......................... G11B 7/00; H01S 3/13
[52] U.S. Cl. ...................................... 369/116; 372/29; 346/76 L; 369/33

[58] Field of Search ..................... 372/29; 369/53-58, 369/32, 33, 100, 116; 358/342; 346/76 L, 135.1

[56] References Cited

U.S. PATENT DOCUMENTS

| | | | |
|---|---|---|---|
| 4,577,320 | 3/1986 | Yoshikawa et al. | 272/29 |
| 4,660,189 | 4/1987 | Tsukamura et al. | 369/32 |
| 4,691,308 | 9/1987 | Takagi et al. | 369/13 |
| 4,821,125 | 4/1989 | Christensen et al. | 260/31 |

*Primary Examiner*—Robert L. Richardson
*Attorney, Agent, or Firm*—Shapiro and Shapiro

[57] ABSTRACT

An optical disk apparatus effect recording reproduction and erasure of information by irradiation with laser beams on an optical disk. In the optical disk apparatus, a plurality of beam heads are correspondingly provided for respective recording regions defined by radially dividing a recording zone on the optical disk.

14 Claims, 3 Drawing Sheets

APPARATUS WITH MULTIPLE HEADS ADJUSTED FOR OPTIMUM PERFORMANCE AT DIFFERENT REGIONS OF OPTICAL DISK

This is a continuation application of Ser. No. 172,678 filed Mar. 24, 1988, now abandoned.

BACKGROUND OF THE INVENTION

1. Field of the Invention

The present invention relates to an optical disk apparatus for recording information in the form of very small pits being formed by irradiation of laser beams on a recording medium and different in optical properties, and for optically reproducing the recorded information.

2. Related Background Art

An optical disk apparatus is well known in which a narrow groove or a narrow protuberance (which is hereinafter referred to as a course) is formed on a recording medium of a disk type in the form of either a spiral or a concentric pattern, and in which very small pits, for example, of the width of 1 μm and of the minimum length of 2 μm, are formed along the course by a laser beam so as to record information on the basis of either the presence/absence or the length of the pit. In the optical disk apparatus of this type, the pits are formed by heat generated upon irradiation with the laser beam focused in a very small diameter on the recording medium. There have been proposed, for example, the following methods of thermal information recording, and some of them have been practically used.

(a) An indentation is formed by sloving or sublimating the medium with the heat to serve as the pit.

(b) An area is phase-transformed with the heat to differ in optical properties such as a refractive index and a reflectance from its original state, serving as the pit.

(c) An area is changed with respect to a direction of magnetization from its original state by degrading with the heat the coercive force of vertical magnetization directed up or down on the medium, reversing the direction of magnetization with application of reversed magnetic field, and then terminating the irradiation of the laser beam. The area serves as the pit. This method is called magneto-optical recording.

The recorded information may be reproduced by using the difference of the processed pit in optical properties from the other area, that is, by irradiating the medium with the laser beam and detecting an optical change of the beam reflected by or transmitted through the medium. In the specification, it should be noted that the term 'pit' includes a simple 'indentation'. Then, the difference in optical properties includes the case that diffraction or interference is caused with an indentation and not without an indentation.

The optical disk apparatus as described need a thermal recording device for recording and an optical reproducing device for reproduction accordingly. Many of such apparatus have a common device both for recording and for reproduction In the common device, it is usual that a beam head including a laser source and an optical system is commonly used both for recording and for reproduction. The beam head is used also for erasure in the conventional apparatus.

Two conditions as described below are known concerning an optimum recording emission power $P_W$ required upon the recording in such optical disk apparatus. The term 'optimum recording emission power' is used to mean a recording emission power for forming a pit in the best condition.

(1) The faster a linear velocity v in the recording zone becomes, the higher the optimum recording emission power $P_W$ is. For example, there is the following relationship in the above-described magneto-optical recording.

$$P_W \propto \sqrt{v}.$$

A rotation angular velocity of the optical disk as the recording medium is constant in the conventional optical disk apparatus, which means that the velocity v becomes greater radially outwardly. Consequently, the more radially outward the recording position, the higher the optimum recording emission power $P_W$ required.

(2) The optimum recording emission power $P_W$ depends on a temperature of the recording medium. The higher the temperature is, the lower the optimum recording emission power $P_W$ is, and the lower the temperature, the higher the power.

From the above conditions (1) and (2), a required maximum value $P_{Wmax}$ of the power is the optimum recording emission power at the lowest operation temperature on the radially outermost course of the recording zone on the disk, and a required minimum value $P_{Wmin}$ is the optimum recording emission power at the highest operation temperation on the radially innermost course of the recording zone. Further, it is noted from the conditions (1) and (2) that the required emission power becomes higher either as the lowest operation temperature is set lower or as the recording zone of the disk is enlarged radially outward.

If the emission power is set too high upon the reproduction, the recorded information might be destroyed. The emission power upon the reproduction is thus set much lower than that upon the recording, also following the above-described conditions (1) and (2). The upper limit $P_R$ of the emission power for the reproduction can be obtained at each of radial positions of the recording zone at the maximum operation temperature. In order to cover both the entire temperature range and the entire recording zone required for the reproduction, the reproducing emission power must be lower than the upper limit power $P_{RO}$ in the radially innermost position. Generally, the reproducing emission power is limited below $P_{RO}$ by reducing an output from the laser source.

As described, the emission powers $P_{Wmax}$, $P_{Wmin}$ and $P_{RO}$ are provided based on the operation temperature range and the size or recording zone of an optical disk medium. Normally, there is a great difference between $P_{Wmax}$ and $P_{RO}$. The current technology can barely provide a semiconductor laser of a small maximum output. Therefore, it is necessary to increase beam emission efficiency from the semiconductor laser to an objective in order to supply the maximum emission power $P_{Wmax}$ of the beam head. However, the output from the laser source must be decreased to keep the reproduction emission power below $P_{RO}$. It is known that signal to noise (S/N) ratio will be aggravated due to noise increase as the output of the semiconductor laser is excessively decreased. Therefore, since the output from the laser source must be kept over a certain level, the beam emission efficiency has to be lowered in accordance with the increase of the output. In case of the conventional optical disk apparatus having a single beam head, the operation temperature range or the recording zone is extremely restricted because of the limited adjustable range of the emission power of the beam head.

There is a technique known for preventing the decrease of S/N ratio due to noise in the low laser power, e.g, superposing a high frequency on the laser. However, such a technique requires a separate, complex circuit.

SUMMARY OF THE INVENTION

It is an object of the invention to provide an optical disk apparatus without the above-described problems, using a plurality of beam heads different in adjustable range of emission power.

An optical disk apparatus according to the present invention is for effecting recording and reproduction by irradiation with laser beams on an optical disk, in which beam heads are correspondingly provided for respective recording regions defined by radially dividing a recording zone on the optical disk, the beam heads having respective adjustable ranges of laser beam emission power suitable for the corresponding recording regions Since the beam heads are provided for plural regions radially deviated on the disk and have adjustable ranges of laser beam emission power suitable for the corresponding regions, information may be written-in on the disk upon recording by emission of power required from each beam head for recording on the radially outermost course of each corresponding region. Upon reproduction, each beam head may emit a laser beam of emission power high enough to exclude the problem of noise and low enough to keep the recorded information on the radially innermost course from being destroyed enabling read-out of information in a high S/N ratio. Accordingly, the operation temperature range or the recording zone may be widened in accordance with demands

DETAILED DESCRIPTION OF THE PREFERRED EMBODIMENTS

Figure 1:
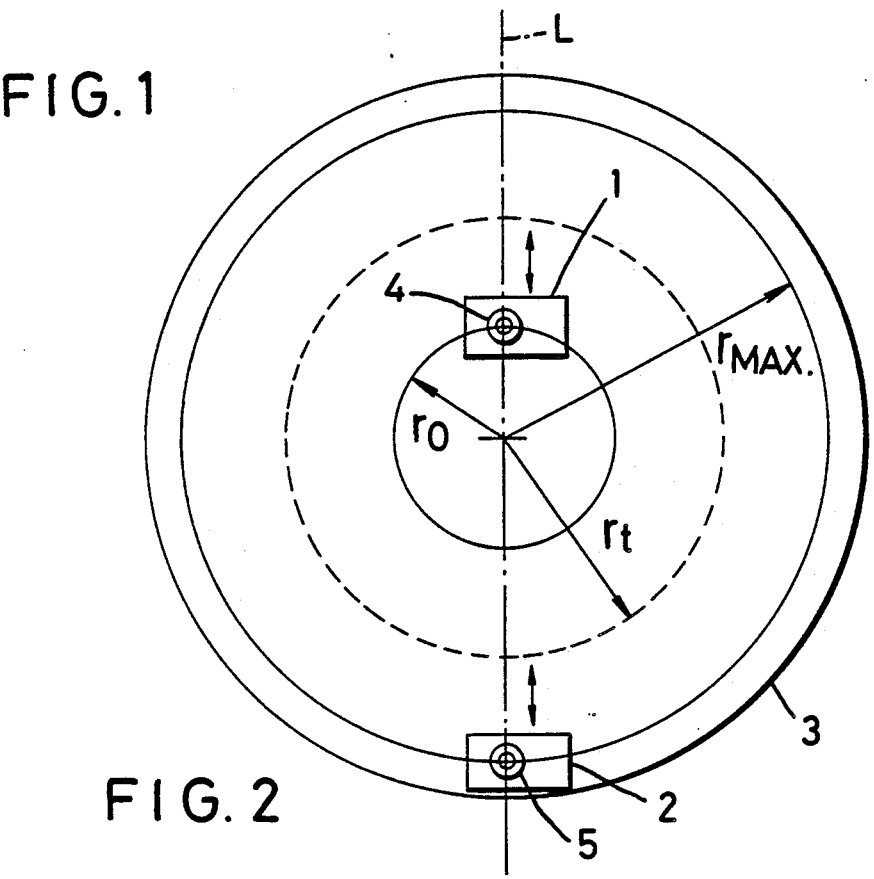
FIG. 1 is a view of arrangement of beam heads in an embodiment of the present invention.

FIG. 1 shows the first embodiment of the present invention with two beam heads in which a recording zone of an optical disk is divided into two regions, one radially outside and the other inside of the disk, and a beam head is arranged for each of the regions. Beam head 1 is for an inner half of the recording zone of optical disk 3 between radius $r_o$ and radius $r_t$, and beam head 2 is for an outer half thereof between radius $r_t$ and radius $r_{max}$. The beam heads 1, 2 perform recording, reproduction and erasure in their assigned regions, respectively. The rotation center of the disk 3 is located between the heads 1, 2. Optical axes of objective lenses 4, 5 of the heads intersect a straight line L passing through the rotation center of the disk 3. The beam heads 1, 2 are driven in the directions of the adjacent arrows by a drive system (not shown) so that they may effect the recording, the reproduction and the erasure along a straight line in the recording regions.

The beam heads 1, 2, have semiconductor lasers (not shown) and the object lenses 4, 5, respectively. The semiconductor lasers both are of the maximum output of 25 mW and the minimum output of 5 mW. Emission efficiencies of the objective lenses 4, 5 differ from each other to be 20% for the head 1 and 30% for the head 2. As a result, the maximum and the minimum emission powers of the heads 1, 2 are as follows.

TABLE

| | head 1 | head 2 |
|---|---|---|
| maximum record emission power (mW) | 5 | 7.5 |
| minimum reproduction emission power (mW) | 1 | 1.5 |

Figure 2:
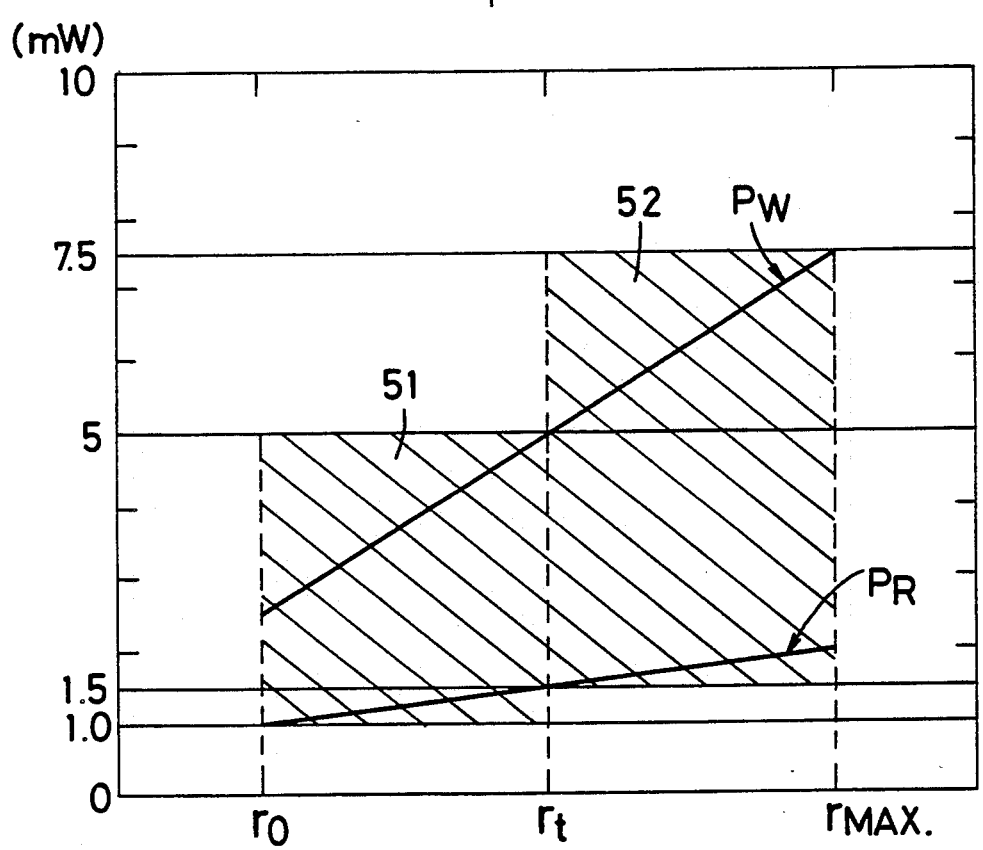
FIG. 2 is a graph showing emission power ranges of the beam heads in the FIG. 1 embodiment and limit properties of $P_R$ and $P_W$ of an optical disk to which the beam heads can be applied.

FIG. 2 is a graph showing a relation between radii of the optical disk 3 and emission powers of the heads. Hatched area 51 between $r_o$ and $r_t$ represents the emission power of the head 1 and another hatched area 52 between $r_t$ and $r_{max}$ does that of the head 2.

A property as shown by $P_W$ in FIG. 2 indicates optimum recording emission powers for the respective radii at the minimum operation temperature. A property as shown by $P_R$ in FIG. 2 indicates the upper limits of the reproduction emission powers for the respective radii at the maximum operation temperature. The two beam heads 1, 2 of the emission powers as shown in FIG. 2 can be applied to the recording, the reproduction and the erasure on the optical disk having the above properties $P_W$ and $P_R$. Furthermore, the beam heads 1, 2 having the emission power property as shown in FIG. 2 can be used for the recording, the reproduction and the erasure in respective regions on an optical disk having an optimum recording emission power and an upper limit of the reproducing emission power residing within an area between the properties $P_W$ and $P_R$. It is, however, noted that the beam heads of the present embodiment cannot be applied to an optical disk of properties either over $P_W$ or below $P_R$ in FIG. 2.

Figure 3:
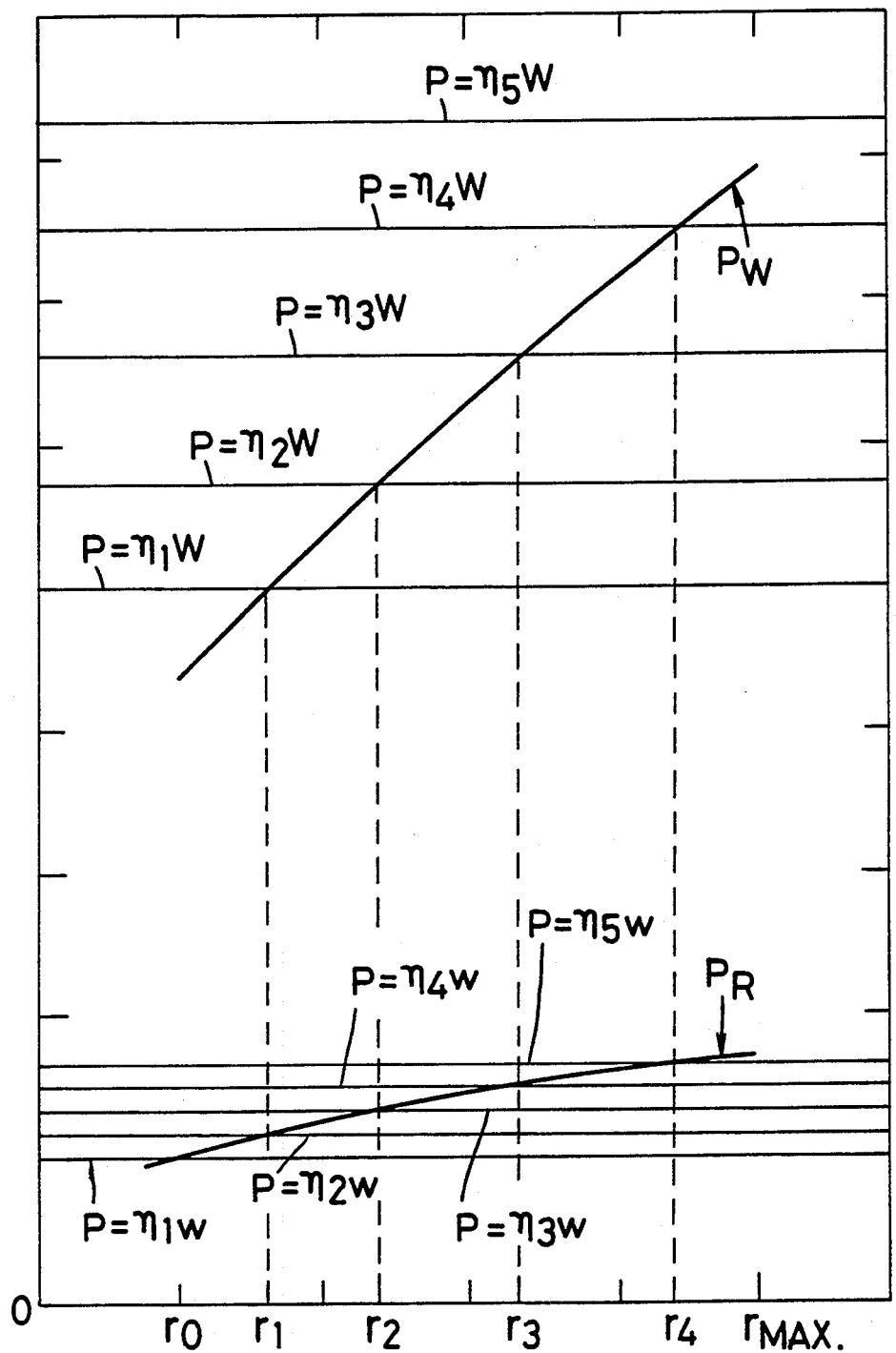
FIG. 3 is a graph for explaining processes determining efficiencies of beam heads to be used.

There will be explained processes for determining the emission power properties of beam heads referring to FIG. 3.

Once the operation temperature range of an optical disk apparatus and the recording zone on the disk are determined, there can be provided a relation between a recording radius and the optimum recording emission power $P_W$ at the lowest operation temperature and a relation between the recording radius and the upper limit reproducing emission power $P_R$ at the highest operation temperature based on properties of the optical disk medium. It is, for example, assumed that the properties of emission powers are as shown as $P_W$, $P_R$ in FIG. 3. When an emission efficiency of a beam head is denoted by $\eta$, the maximum output of a beam source is by W, and the minimum output of the source with noise being practically low enough is by w, the maximum emission power of the beam head is given by $\eta W$ and the minimum reproduction emission power is by $\eta w$. Here, output properties of laser sources of the optical heads are identical.

The number and the emission efficiencies of the beam heads will be determined following the below steps (a) First, η1 is so determined with respect to the upper limit reproduction emission power $P_{RO}$ on the radially innermost course of the recording zone at radius $r_o$ on the disk, as to satisfy the following relation.

$$\eta_1 w > P_{RO}$$

(b) Second, a recordable radius is obtained with respect to the maximum emission power $\eta_1 W$.

(c) When the maximum radius as obtained in step (b) is represented by $r_1$, $\eta_2$ is so determined with respect to the upper limit reproduction emission power $P_{R1}$ at the radius $r_1$ as to satisfy the following relation.

$$\eta_2 w < P_{R1}.$$

(d) Then, a recordable radius with the maximum emission power $\eta_2 W$ is obtained. That is, radius $r_2$ is determined.

Repeating the above steps to the outermost recording zone or radius $r_{max}$, the number and the emission efficiencies of required beam heads are determined. In this example as shown in FIG. 3, five heads are required.

Figure 4:
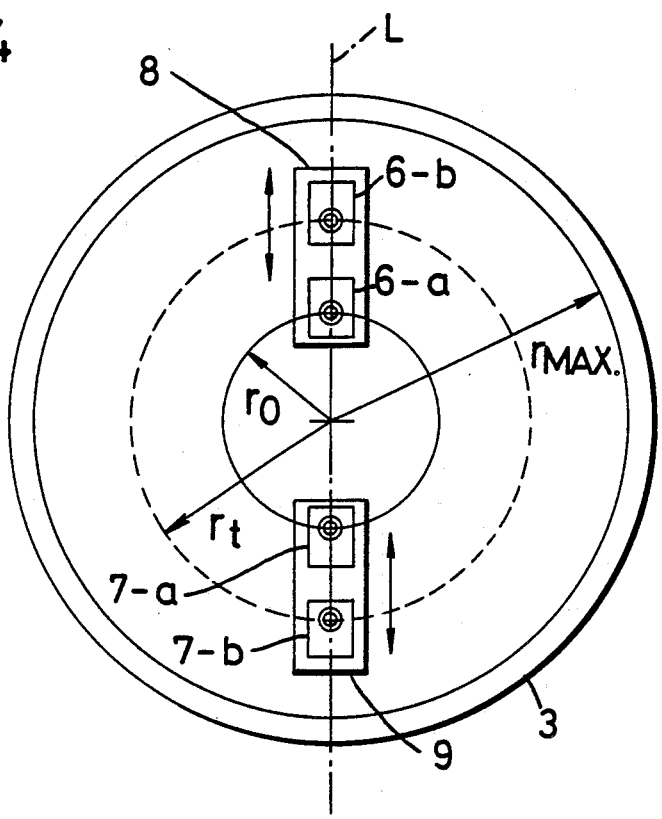
FIG. 4 is a view showing another arrangement of beam heads.

The second embodiment relates to an arrangement of beam heads for a magneto-optical disk as described in U.S. Pat. No. 4,691,308. The second embodiment as shown in FIG. 4 is an example in which two beam heads independently effecting the recording, the reproduction and the erasure on the disk are structured to move together in a united manner.

In detail, a pair of beam heads 6-a, 6-b and another pair of beam heads 7-a, 7-b are secured on sliders 8, 9, respectively. The two beam heads on each slider are driven in unison The rotation center of the disk is located between the sliders 8, 9. Optical axes of object lenses of the beam heads intersect a straight line L passing through the rotation center. Semiconductor lasers (not shown) have the same output. The beam heads 6-a, 7-a are arranged to have the same emission efficiency of 20% and the heads 6-b, 7-b 30%. A distance between the objective lenses of the two beam heads either and 6b, or, 7a and 7b on each slider is identical to $(r_t-r_o)$ or $(r_{max}-r_t)$. According to this arrangement, after the beam heads on the slider 8 erased an old recording, the beam heads on the slider 9 may conduct recording of new signals a half turn behind the disk. Either of the sliders 8, 9 is operated upon the reproduction. The two beam heads on each slider simultaneously perform either operation of the recording, the reproducing and the erasing Emission powers of the laser sources increase in the order of the reproduction, the erasure and the recording.

Figure 5:
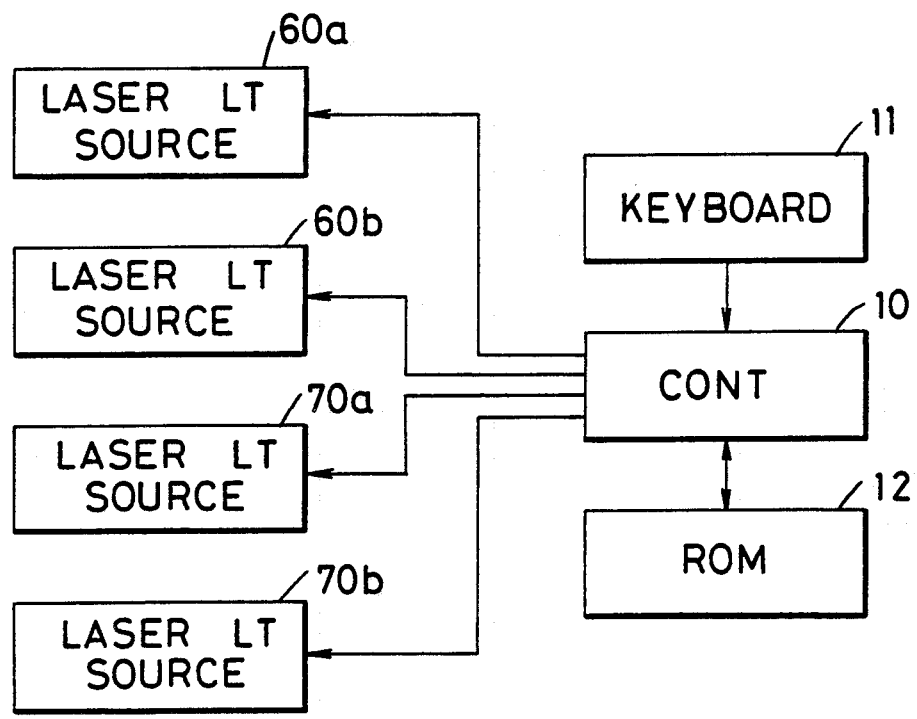
FIG. 5 is a block diagram showing a part of structure of the apparatus as shown in FIG. 4.

FIG. 5 is a block diagram showing a part of structure of the second embodiment A control circuit 10 discriminates, based on an output from a key-board 11, whether either the recording or the reproduction should be conducted and controls, based on data stored in ROM 12, voltages to be applied to the laser sources 60a, 60b, 70a, 70b. In the second embodiment, since each beam head works for either the reproduction and the erasure, or, the reproduction and the recording, two output data for each laser source are stored in the ROM. In case of the first embodiment, since each beam head functions for all the recording, the reproduction and the erasure, three output data for each laser source should be stored in the ROM.

Although the described embodiments are such that the outputs of the semiconductor lasers are all identical and that the emission power properties for the beam heads differ from each other by changing efficiencies of optical systems, it is of course acceptable to use a combination of semiconductor lasers different in output range and optical systems different in efficiency.

As described, the present invention provides an optical disk apparatus enabling widening the recording zone and the operation temperature range as compared to the conventional apparatus with a single beam head beam heads different in adjustable range of laser beam emission power are assigned to work for the recording. The reproduction and the erasure in respective recording regions which are defined by radially dividing the recording zone on the optical disk.

What is claimed is:

1. An apparatus for rotating a disk placed thereon about a predetermined axis, recording data on said disk and reproducing data recorded on said disk, comprising:

first head means having a first laser source and a first objective optical system for guiding a laser beam emitted by said first laser source to said disk to record and reproduce data; and second head means having a second laser source and a second objective optical system for guiding a laser beam emitted by said second laser source to said disk to record and reproduce data, the range of the intensity of the laser beam emitted by said second laser source being substantially equal to the range of the intensity of the laser beam emitted by said first laser source;

said first head means and said second head means being movable radially of said disk and such that said first and said second head means radiate laser beams on corresponding regions of said disk, respectively, the region of said disk corresponding to said first head means being disposed radially outside of the region of said disk corresponding to said second head means, emission efficiency of said first objective optical system being higher than emission efficiency of said second objective optical system.

2. An apparatus according to claim 1, wherein each of said laser sources is a semiconductor laser.

3. An apparatus according to claim 2, which further comprises control means for controlling the intensity of each of the laser beams of said first and said second laser sources to cause said first head means and said second head means to record, reproduce and erase data on said disk.

4. An apparatus for rotating a disk placed thereon about a predetermined axis, recording data on said disk and reproducing data recorded on said disk, comprising:

first head means having a first laser source and a first objective optical system for guiding a laser beam emitted by said first laser source to said disk to record and reproduce data; and second head means having a second laser source and a second objective optical system for guiding a laser beam emitted by said second laser source to said disk to record and reproduce data;

said first head means and said second head means being movable radially of said disk and such that said first and said second head means radiate laser beams on corresponding regions of said disk, respectively, the region of said disk corresponding to said first head means being disposed radially outside of the region of said disk corresponding to said second head means, said first head means and said second head means being constructed such that a maximum value and a minimum value of the intensity range of the laser beam from said first head means are respectively larger than a maximum value and a minimum value of the intensity range of the laser beam from said second head means.

5. An apparatus according to claim 4, wherein the range of the intensity of the laser beam emitted by said first laser source is substantially equal to the range of the intensity of the laser beam emitted by said second laser source, and wherein emission efficiencies of said first and said second objective optical systems are different from each other.

6. An apparatus according to claim 4, wherein said first and said second head means are disposed so that optical axes of said first and said second objective optical systems substantially intersect a straight line passing through said predetermined axis radially of said disk.

7. An apparatus according to claim 6, wherein said first and said second head means are disposed so that said predetermined axis is positioned between said first and said second head means.

8. An apparatus according to claim 7, which further comprises slider means for fixedly disposing said first and said second head means thereon and movable radially of said disk.

9. An apparatus for rotating a disk placed thereon about a predetermined axis, recording data on said disk and reproducing data recorded on said disk, comprising:
first head means having a first laser source and a first objective optical system for guiding a laser beam emitted by said first laser source to said disk to record and reproduce data; and
second head means having a second laser source and a second objective optical system for guiding a laser beam emitted by said second laser source to said disk to record and reproduce data;
said first head means and said second head means being movable radially of said disk and such that said first and said second head means radiate laser beams on corresponding regions of said disk, respectively, the region of said disk corresponding to said first head means being disposed radially outside of the region of said disk corresponding to said second head means, emission efficiency of said first objective optical system being higher than emission efficiency of said second objective optical system.

10. An apparatus for rotating a disk placed thereon about a predetermined axis, recording data on said disk and reproducing data recorded on said disk, comprising:
first head means having a first laser source and a first optical system for guiding a laser beam emitted by said first laser source to said disk to record and reproduce data; and
second head means having a second laser source and a second optical system for guiding a laser beam emitted by said second laser source to said disk to record and reproduce data;
said first head means and said second head means being movable radially of said disk and such that said first and said second head means radiate laser beams on corresponding regions of said disk, respectively, the region of said disk corresponding to said first head means being disposed radially outside of the region of said disk corresponding to said second head means, beam emission power of said first head means being higher than beam emission power of said second head means.

11. An apparatus according to claim 10, wherein emission efficiency of said first optical system is higher than emission efficiency of said second optical system.

12. An apparatus for rotating a disk placed thereon about a predetermined axis and recording data on said disk, comprising:
first head means having a first laser source and means for guiding a recording laser beam emitted by said first laser source to said disk to record data; and
second head means having a second laser source and means for guiding a recording laser beam emitted by said second laser source to said disk to record data;
said first head means and said second head means being movable radially of said disk and such that said first and second head means radiate laser beams on corresponding regions of said disk, respectively, the region of said disk corresponding to said first head means being disposed radially outside of the region of said disk corresponding to said second head means, beam emission power of the recording laser beam of said first head means being higher than beam emission power of the recording laser beam of said second head means.

13. An apparatus according to claim 12, wherein said apparatus is also for reproducing data recorded on said disk and wherein said first head means includes means for guiding a reproducing laser beam emitted by said first laser source to said disk to reproduce data and said second head means includes means for guiding a reproducing laser beam emitted by said second laser source to said disk to reproduce data, the beam emission power of said reproducing laser beams being substantially smaller than the beam emission power of said recording laser beams.

14. An apparatus according to claim 13, wherein the beam emission power of the reproducing laser beam of said first head means is higher than the beam emission power of the reproducing laser beam of said second head means.

* * * * *